United States Patent [19]

Kajiwara et al.

[11] Patent Number: 4,858,950
[45] Date of Patent: Aug. 22, 1989

[54] VEHICLE HEIGHT ADJUSTING DEVICE

[75] Inventors: Hajime Kajiwara; Masami Ogura, both of Saitama; Shoichi Sano, Tokyo, all of Japan

[73] Assignee: Honda Giken Kogyo Kabushiki Kaisha, Tokyo, Japan

[21] Appl. No.: 167,589

[22] Filed: Mar. 14, 1988

[30] Foreign Application Priority Data

| Mar. 12, 1987 | [JP] | Japan | 62-57823 |
| Mar. 12, 1987 | [JP] | Japan | 62-57824 |
| Mar. 13, 1987 | [JP] | Japan | 62-58574 |

[51] Int. Cl.⁴ .................................................. B60G 11/08
[52] U.S. Cl. ..................................... 280/719; 280/669; 280/694; 280/840
[58] Field of Search ............. 280/697, 718, 6 R, 6 H, 280/719, 694, 690, 708, 709, 669, 840

[56] References Cited

U.S. PATENT DOCUMENTS

| 1,841,849 | 1/1932 | Rohr | 280/669 |
| 1,919,670 | 7/1933 | Roos | 280/669 |
| 2,039,983 | 5/1936 | Schlirf | 280/694 |
| 3,034,802 | 5/1962 | Axtmann | 280/669 |
| 3,768,820 | 10/1973 | Yew | 280/6 R |
| 3,782,755 | 3/1988 | Spichala | 280/709 |
| 3,913,932 | 10/1975 | Guerriero et al. | 280/690 |
| 4,288,096 | 9/1981 | Enokimoto et al. | 280/694 |
| 4,364,574 | 12/1982 | Saito | 280/6 R |
| 4,364,582 | 12/1982 | Takahashi et al. | 280/698 |
| 4,377,293 | 3/1983 | Senoo | 280/6 R |
| 4,422,666 | 12/1983 | Proctor | 280/694 |
| 4,557,500 | 12/1985 | Collard et al. | 280/719 |
| 4,568,093 | 2/1986 | Shimizu et al. | 280/6 R |
| 4,613,152 | 9/1986 | Booher | 280/719 |
| 4,619,467 | 10/1986 | Lafferty | 280/708 |

FOREIGN PATENT DOCUMENTS

| 732017 | 2/1943 | Fed. Rep. of Germany . |
| 2541841 | 3/1977 | Fed. Rep. of Germany . |
| 2722015 | 11/1978 | Fed. Rep. of Germany . |
| 61-150809 | 7/1986 | Japan . |

Primary Examiner—Richard A. Bertsch
Attorney, Agent, or Firm—Irving M. Weiner; Joseph P. Carrier; Pamela S. Burt

[57] ABSTRACT

A vehicle height adjusting device includes a resilient member having an outer end coupled to a wheel support member and an inner end supported on a vehicle body, the resilient member having a vertically resilient characteristic and serving as a suspension component, and a load unit disposed between the resilient member and the vehicle body for applying a vertical bonding stress to the resilient member to displace the resilient member for thereby varying the height of the vehicle body. Another vehicle height adjusting device includes an elongate resilient member extending transversely of a vehicle body and having opposite ends coupled respectively to two laterally spaced wheel support members, the resilient member having a vertically resilient characteristic and serving as a suspension component, retaining members supporting an intermediate portion of the elongate resilient member slidably and swingably on the vehicle body at at least two spaced points on the intermediate portion, and a load unit for applying a vertical bending stress to the resilient member to displace the resilient member for thereby varying the height of the vehicle body.

15 Claims, 4 Drawing Sheets

VEHICLE HEIGHT ADJUSTING DEVICE

BACKGROUND OF THE INVENTION

1. Field of the Invention:

The present invention relates to a vehicle height adjusting device having an elongate resilient member provided as a suspension component, having a vertically resilient characteristic, and extending transversely of a vehicle.

2. Description of the Relevant Art:

Generally, conventional vehicle height adjusting devices include a damper comprising a shock absorber which has an additional air chamber serving as an actuator for effecting vehicle height adjustment and also comprising a coil spring. Laterally spaced suspensions have such dampers independently. Such a height adjusting device is disclosed in Japanese Laid-Open Patent Publication No. 61-150809, for example For carrying out vehicle height adjustment, therefore, there have heretofore been required dedicated dampers for making vehicle height adjustment only, each damper comprising a shock absorber which has an additional air chamber serving as an actuator for effecting vehicle height adjustment and also comprising a coil spring. To give a commercially available vehicle a vehicle height adjusting capability, its dampers are replaced with dampers having height adjusting air chambers, and the basic structure of suspensions of the vehicle may have to be modified. Heretofore, since the dedicated dampers or height adjusting actuators are independently associated with the laterally spaced suspensions, respectively, there is a limitation on efforts to make the suspensions smaller and lighter.

SUMMARY OF THE INVENTION

It is an object of the present invention to provide a vehicle height adjusting device which can employ a damper comprising a shock absorber only with no coil spring, can provide a stabilizer function, allows a vehicle height adjusting capability to be easily added to an existing vehicle without modifying existing dampers and the basic structure of suspensions of the vehicle in any way, permits height adjusting actuators to be located in a centralized position so as to make the suspensions smaller and lighter, and can ensure substantially the same suspension capability when the vehicle height is adjusted as that when the vehicle height is not adjusted.

According to the present invention, there is provided a vehicle height adjusting device including a resilient member having an outer end coupled to a wheel support member and an inner end supported on a vehicle body, the resilient member having a vertically resilient characteristic and serving as a suspension component, and load means disposed between the resilient member and the vehicle body for applying a vertical bending stress to the resilient member to displace the resilient member for thereby varying the height of the vehicle body.

According to the present invention, there is also provided a vehicle height adjusting device including an elongate resilient member extending transversely of a vehicle body and having opposite ends coupled respectively to two laterally spaced wheel support members, the resilient member having a vertically resilient characteristic and serving as a suspension component, retaining members supporting an intermediate portion of the elongate resilient member slidably and swingably on the vehicle body at least two spaced points on the intermediate portion, and load means for applying a vertical bending stress to the resilient member to displace the resilient member for thereby varying the height of the vehicle body.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
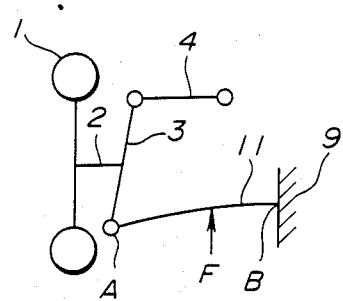
FIG. 1 is a schematic front elevational view of a suspension incorporating a vehicle height adjusting device according to a first embodiment of the present invention.

FIG. 1 shows a vehicle suspension incorporating a vehicle height adjusting device according to a first embodiment of the invention. The suspension shown together with one of laterally spaced road wheels is of the double-wishbone type. A road wheel 1 is rotatably supported on an axle 2 mounted on a support member of knuckle 3 pivotally connected at an upper end thereof to the outer end of an upper arm 4 of the suspension. The suspension also includes a lower arm which is constructed of a resilient member or leaf spring 11 having a vertically resilient charisteristic and extending transversely of the vehicle. More specifically, the leaf spring 11 has a slightly upwardly curved intermediate portion of an arcuate shape. The outer end of the leaf spring 11 is pivotally connected to the lower end of the knuckle 3 at a supporting point A. The leaf spring 11 has its inner end fixedly supported on a vehicle body 9 at a supporting point B.

Although not shown in FIG. 1, a load means of any desired type is interposed between the vehicle body 9 and the intermediate portion of the leaf spring 11, and a damper comprising a shock absorber only is associated with the suspension.

Since the lower arm, which cooperates with the upper arm 4 in constructing the double-wishbone suspension, is constructed of the leaf spring 11, the portion of the suspension pivotally coupled to the leaf spring 11 at the outer supporting point A near the road wheel 1 is normally urged downwardly under the resiliency of the arcuate leaf spring 11 which is supported on the vehicle body 9 at the inner supporting point B. Therefore, as the leaf spring 11 doubles as the lower arm, the suspension is made lightweight. The suspension can also employ dampers each comprising a shock absorber only, i.e., with no coil spring, as discussed above.

When an upward bending stress, for example, is applied to the leaf spring 11 at a portion or in a certain range thereof by the load means, as indicated by the arrow F, the leaf spring 11 fixed to the vehicle body 9 at the inner supporting point B is elastically deformed, lifting its outer supporting point A, i.e., moving the road wheel 1 upwardly with respect to the vehicle body 9. The vehicle height above ground is thus lowered. Conversely, the vehicle height above ground is increased by applying a downward bending stress to the leaf spring 11.

Figure 2:
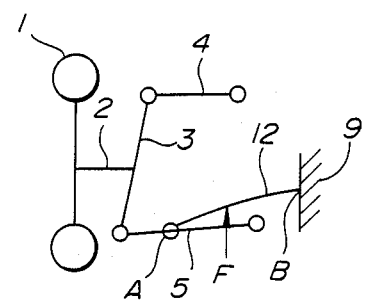
FIG. 2 is a schematic front elevational view of a suspension incorporating a vehicle height adjusting device according to a second embodiment of the present invention.

FIG. 2 shows a second embodiment in which a lower arm 5 has an outer end pivotally coupled to the lower end of a knuckle 3 and a leaf spring 12 is provided separately from the lower arm 5. The leaf spring 12 has an outer end pivotally coupled to an intermediate portion of the lower arm 5 at a supporting point A and an inner end fixedly supported on a vehicle body 9 at a supporting point B.

The arrangement shown in FIG. 2 operates in the same manner and offers the same advantages as the construction shown in FIG. 1, except that the leaf spring doubles as the lower arm in FIG. 1.

Figure 3:
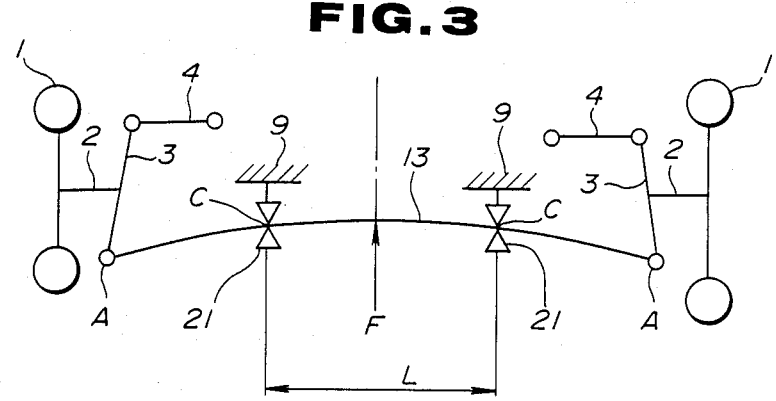
FIG. 3 is a schematic front elevational view of two laterally spaced suspensions incorporating a vehicle height adjusting device according to a third embodiment of the present invention.

According to a third embodiment shown in FIG. 3, two laterally spaced suspensions each identical to that of the first embodiment are interconnected by a leaf spring 13 which is elongate transversely of the vehicle. The leaf spring 13 is of an arcuate shape with its intermediate portion curved upwardly, and is longer than the leaf springs 11, 12 shown in FIGS. 1 and 2. The opposite ends of the leaf spring 13 are pivotally coupled at supporting points A to the lower ends of laterally spaced knuckles or support members 3 supporting road wheels 1, respectively, through axles 2. The leaf spring 13 has its intermediate portion slidably and swingably supported on a vehicle body 9 at two laterally spaced supporting points C by means of retaining members 21, respectively. The leaf spring 13 doubles as two lower arms.

Although not shown, a load means of any desired type is interposed between the vehicle body 9 and a central area, for example, of the intermediate portion of the leaf spring 13 between the supporting points C, and a damper comprising a shock absorber only is associated with each of the suspensions.

Since the lower arms 5 are constructed of the common leaf spring 13, the portions of the suspensions pivotally coupled to the leaf spring 13 at supporting points A on the opposite ends of the leaf spring 13 near the road wheels 1 are normally urged downwardly under the resiliency of the arcuate leaf spring 13 which is supported on the vehicle body 9 at the two laterally spaced supporting points C on the intermediate portion of the leaf spring 13, with the load means interposed between the leaf spring 13 and the vehicle body 9 between the supporting points C. Therefore, the common leaf spring 13 doubling as the lower arms gives the suspensions a stabilizer function, the load means is shared by the suspensions, and the suspensions are made lightweight. The suspensions can also employ dampers each comprising a shock absorber only, i.e., with no coil spring, as discussed above.

When an upward bending stress, for example, is applied to the leaf spring 13 at its center or within a certain intermediate range L between the supporting points C by the load means, as indicated by the arrow F, the leaf spring 13 is elastically deformed, lifting its intermediate portion. The supporting points A on the opposite ends of the leaf spring 13 near the road wheels 1 are then lowered about the supporting points C, so that the road wheels 1 are moved downwardly with respect to the vehicle body 9, resulting in an increase in the vehicle height above ground. Conversely, when a downward bending stress is imposed on the intermediate portion of the leaf spring 13, the vehicle height above ground is reduced.

Figure 4:
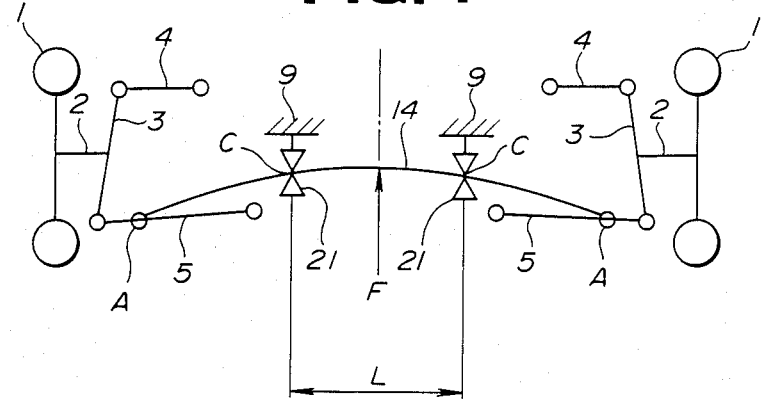
FIG. 4 is a schematic front elevational view of two laterally spaced suspensions incorporating a vehicle height adjusting device according to a fourth embodiment of the present invention.

FIG. 4 shows a fourth embodiment in which two laterally spaced suspensions each identical that of the second embodiment are interconnected by a leaf spring 14 which is elongate transversely of a vehicle. More specifically, the elongate leaf spring 14, which is separate from two laterally spaced lower arms 5, has opposite ends pivotally coupled at supporting points A to intermediate portions of the lower arms 5, respectively. The leaf spring 14 has an intermediate portion slidably and swingably supported on a vehicle body 9 at two laterally spaced supporting points C by means of retaining members 21, respectively.

The arrangement shown in FIG. 4 operates in the same manner and offers the same advantages as the construction shown in FIG. 3, except that the leaf spring doubles as the lower arms in FIG. 3.

In the third and fourth embodiments, the elongate leaf springs 13, 14 are employed and a vertical bending stress is applied by the load means to a limited range L of the intermediate portion of the leaf springs 13, 14. Therefore, the supporting points A near th road wheels 1 can be displaced a relatively large distance by a relatively small vertical displacement of the intermediate range L. Inasmuch as the load means is disposed between the supporting points C on both sides of the intermediate portion of the leaf springs 13, 14 in a generally centralized location, height adjusting actuators are not required to be associated independently with the road wheels 1. This allows the suspensions to be smaller and lighter.

Figure 5:
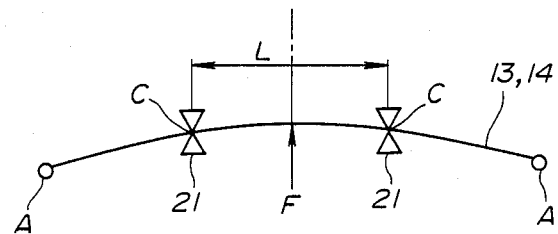
FIG. 5 is a schematic front elevational view showing the manner in which a concentrated load is applied to the center of a resilient member by a load means in the third and fourth embodiments.
Figure 6:
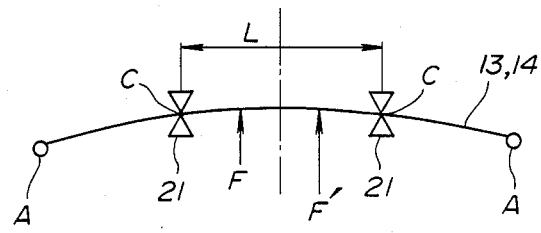
FIG. 6 is a schematic front elevational view showing the manner in which different concentrated loads are applied at two spaced positions to an intermediate portion of a resilient member by a load means in the third and fourth embodiments.

The leaf spring 13, 14 may be subjected to a centralized load F applied to the center of the leaf spring 13, 14, as shown in FIG. 5. However, independent vehicle height adjustments may be effected at the laterally spaced road wheels 1 by applying different centralized loads F, F' to two laterally spaced points on the leaf spring 13, 14 between the supporting points B, as shown in FIG. 6.

Figure 7:
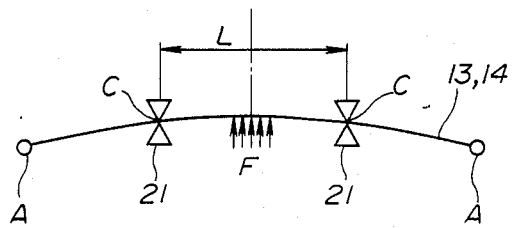
FIG. 7 is a schematic front elevational view showing the manner in which uniform equally distributed loads are applied to an intermediate portion of a resilient member by a load means in the third and fourth embodiments.
Figure 8:
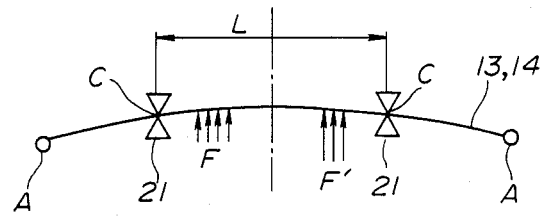
FIG. 8 is a schematic front elevational view showing the manner in which irregularly distributed loads are applied at two spaced positions to an intermediate portion of a resilient member by a load means in the third and fourth embodiments.

Instead of the centralized loads, uniform equally distributed loads F may be applied to the leaf spring 13, 14 within an intermediate range L to avoid stress concentration on the leaf spring 13, 14, as shown in FIG. 7. Alternatively, as shown in FIG. 8, irregularly distributed loads F, F' may be impressed on the leaf spring at two laterally spaced areas in the intermediate range L to avoid stress concentraion and also to permit independent vehicle height adjustments at the road wheels 1.

As will be understood by persons of ordinary skill in the art, many modifications or variations can be made to the presently disclosed preferred embodiments. For example, the leaf spring or resilient member 11, 12, 13, or 14 may be coupled to the upper arms 4 or may double as the upper arms. The present invention is applicable to not only double-wishbone suspensions but also strut suspensions. The leaf spring 13, 14 may be supported on the vehicle body at four laterally spaced points C on the intermediate portion of the leaf spring.

The load means may be disposed upwardly of the leaf spring or both upwardly and downwardly of the leaf spring. A leaf spring extending longitudinally of the vehicle may be used for vehicle height adjustment.

A load means which can be employed in the vehicle height adjusting devices according to the aforesaid embodiments will be described below.

Figure 9:
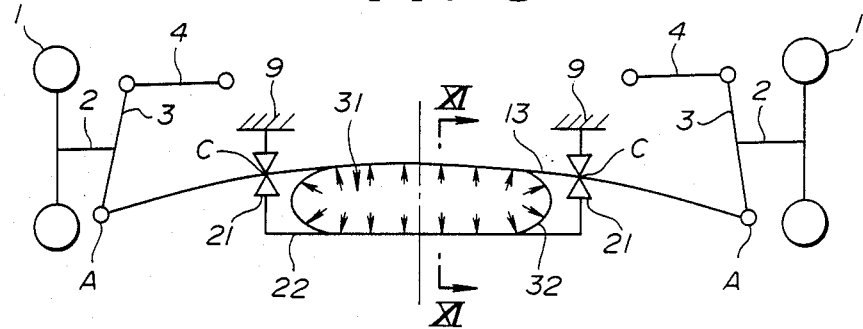
FIG. 9 is a schematic front elevational view showing a fluid-filled enclosure used as the load means in the embodiment of FIG. 3.

FIG. 9 shows a load means for use with the vehicle height adjusting device according to the third embodiment shown in FIG. 3. The retaining members or means 21 by which the elongate leaf spring 13 is supported on the vehicle body 9 at the supporting points C, C have a beam or box 22 disposed below the leaf spring 13 and extending substantially parallel to the leaf spring 13 in the transverse direction of the vehicle. A load means 31 comprising an enclosure 32 filled with a fluid is disposed between the leaf spring 13 and the beam 22 and extends transversely of the vehicle.

The enclosure 32 may be unexpandable and the fluid filled therein may be a gas which is a compressible fluid. Alternatively, the enclosure 32 may be expandable and the fluid filled therein may be a liquid which is a noncompressible fluid.

Figure 11A:
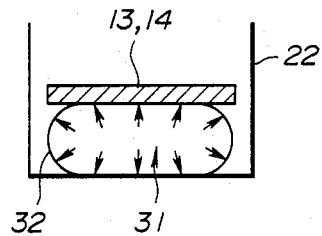
FIG. 11(a) is a cross-sectional view taken along line XI—XI of FIGS. 9 and 10, showing the condition when the pressure of the fluid in the enclosure is lower.
Figure 11B:
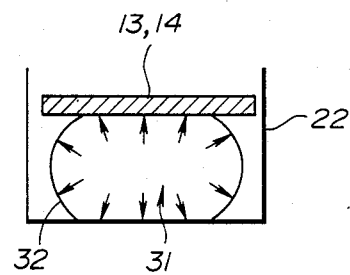
FIG. 11(b) is a cross-sectional view taken along line XI—XI of FIGS. 9 and 10, showing the condition when the pressure of the fluid in the enclosure is higher.

A gas or a liquid is injected by a pump or the like (not shown) into the enclosure 32 of the load means 31 which is prevented from moving downwardly by the beam 22 that is integral with the vehicle body 9, for thereby increasing the internal pressure in the enclosure 32 from the condition of FIG. 11(a) to the condition of FIG. 11(b). By thus applying an upward bending stress to the leaf spring 13, 14 between the supporting points C, the leaf spring 13 is elastically deformed, lifting its intermediate portion. The supporting points A on the opposite ends of the leaf spring 13, 14 near the road wheels 1 are then lowered about the supporting points C, so that the road wheels 1 are moved downwardly with respect to the vehicle body 9, resulting in an increase in the vehicle height above ground. Conversely, the vehicle height above ground is lowered by reducing the internal pressure in the enclosure 32 from the condition of FIG. 11(b) to the condition of FIG. 11(a) for thereby weakening the upward bending stress applied to the leaf spring 13 between the supporting points C by the load means 31.

Since equally distributed loads are applied to the leaf spring 13, 14 between the supporting points C by the load means 31 comprising the fluid filled in the enclosure 32, stress concentration on the leaf spring 13 can be avoided, and the supporting points A on the opposite ends of the leaf spring 13, 14 can be displaced a relatively large distance in response to a relatively small displacement of the leaf spring 13, 14 between the supporting points C. In addition, because the load means 31 is centrally positioned between the laterally spaced supporting points C on the intermediate portion of the leaf spring 13, 14 height adjusting actuators are not associated independently with the road wheels 1. This allows the suspensions to be smaller and lighter.

If a bending stress were applied to the leaf spring 13, 14 by means of an actuator such as a hydraulic cylinder unit, the supporting points C would be substantially fixed because the leaf spring 13, 14 and the actuator would be coupled through a fixed point, and vertical swinging movement of the supporting points A on the opposite ends of the leaf spring 13, 14 would be limited by the fixed supporting points C. Therefore, the leaf spring 13, 14 would be elastically deformed in different modes. With the vehicle height adjusted, the suspension capability would become different from that which it would be if no vehicle height adjustment were effected, and the stabilizer function would also be impaired.

According to the present invention, however, the load means 31 comprises a compressible fluid filled in an unexpandable enclosure 32, or a noncompressible fluid filled in an expandable enclosure 32, for example, so that the load means 31 can follow the bending displacement of the leaf spring 13, 14 between the supporting points C dependent on the internal pressure in the enclosure 32. Therefore, even when the vehicle height is adjusted, the portion of the leaf spring 13, 14 between the supporting points C can be kept substantially in a free state.

More specifically, with the vehicle height adjusted, the portion of the leaf spring 13, 14 between the supporting points C can be freely bent upwardly when the road wheels 1 rebound, while the load means 31 is following the bending displacement of the leaf spring 13, 14 except when the load means 31 excessively rebounds under reactive forces due to the internal pressure of the fluid in the enclosure 32. Downward bending displacement of the leaf spring 13, 14 between the supporting points C when the road wheels 1 bound is substantially freely effected while the load means 31 is following the bending displacement of the leaf spring 13, 14 through either compression of the compressible fluid sealed in the unexpandable enclosure 32 under the load, or contraction of the expandable enclosure 32 in which the noncompressible fluid is sealed. Therefore, vertical swinging movement of the supporting points A on the opposite ends of the leaf spring 13, 14 upon bounding and rebounding the road wheels 1 remains to the extent that the leaf spring 13, 14 is permitted to slide and swing at the supporting points C.

Therefore, even with the vehicle height adjusted, the leaf spring 13, 14 is elastically deformed in substantially the same mode as that which would be if the vehicle height were not adjusted. Consequently, substantially the same suspension capability as that which would be if the vehicle height were not adjusted can be maintained, and the stabilizer function can also be maintained.

Figure 10:
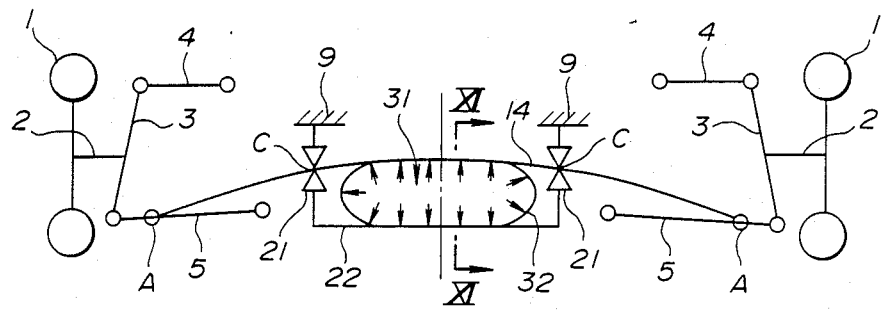
FIG. 10 is a schematic front elevational view showing a fluid-filled enclosure used as the load means in the embodiment of FIG. 4.

FIG. 10 shows a load means for use with the vehicle height adjusting device according to the fourth embodiment illustrated in FIG. 4. The retaining members or means 21 have a beam or box 22 accommodating a fluid-filled enclosure 32. The load means shown in FIG. 10 operates in the same way and offers the same advantages as those of the load means shown in FIG. 9.

Figure 12:
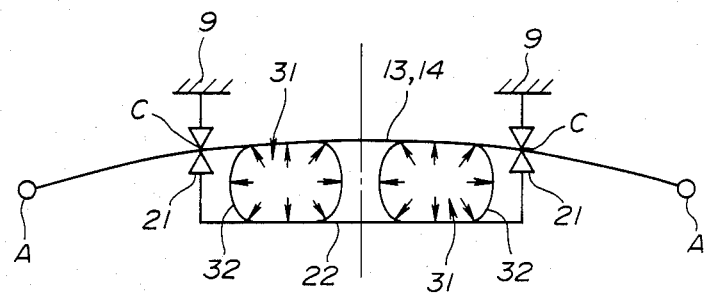
FIG. 12 is a schematic front elevational view showing a modification of the enclosure illustrated in FIGS. 9 and 10.

According to a modification shown in FIG. 12, two load means 31 which are substantially the same as the load means 31 described above may be disposed in the beam 22 at laterally spaced locations, and the fluid pressures in the enclosures 32 may suitably be selected for independent vehicle height adjustment at the road wheels 1.

With the present invention, as described above, a suspension component is constructed of a resilient member having a vertically resilient charisteristic, and the resilient member has portions coupled to road wheels and an intermediate portion supported on the body of the vehicle at areas spaced from the coupled portions. Therefore, dampers each comprising a shock absorber only, i.e., with no coil spring, may be effectively employed. Furthermore, a load means is provided for applying a vertical bending stress to the resilient member to displace the resilient member for varying the height of the vehicle. Accordingly, a vehicle height adjusting capability can easily be added to an existing vehicle without modifying the dampers and the basic structure of suspensions of the vehicle.

Where the load means comprises a fluid filled in an enclosure, e.g., a compressible fluid filled in an unexpandable enclosure, or a noncompressible fluid filled in an expandable enclosure, stress concentration on the resilient member can be avoided and the load means is capable of following bending displacement of the resilient member. Therefore, when the road wheels bound or rebound with the vehicle height adjusted, the resilient member is elastically deformed in substantially the same mode as that which would be if the vehicle height were not adjusted. As a result, substantially the same suspension capability as that which would be if the vehicle height were not adjusted can be maintained.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. Vehicle height adjusting apparatus, comprising:
    an elongate resilient member extending transversely of a vehicle body and having opposite ends coupled respectively to two laterally spaced wheel support members, said resilient member having a vertically resilient characteristic and serving as a suspension component;
    retaining means supporting an intermediate portion of said resilient member slidably and swingably on said vehicle body at at least two spaced points on said intermediate portion;
    load means for applying a vertical bending stress to said resilient member to displace the resilient member for thereby varying the height of the vehicle body; and
    said load means including means for applying different concentrated loads to a plurality of points in a range between said two spaced points on said elongate resilient member supported by said retaining means.

2. Apparatus according to claim 1, including:
    upper arms having outer ends pivotally coupled to upper portions of said wheel support members, respectively;
    said opposite ends of said resilient member being pivotally coupled respectively to lower portions of said wheel support members; and
    said resilient member cooperating with said upper arms in providing double-wishbone suspensions.

3. Apparatus according to claim 1, including:
    upper arms having outer ends pivotally coupled to upper portions of said wheel support members, respectively; and
    lower arms having outer ends pivotally coupled to lower portions of said wheel support members, respectively;
    said opposite ends of said resilient member being pivotally coupled respectively to said lower arms; and
    said lower arms cooperating with said upper arms and said wheel support members in providing double-wishbone suspensions.

4. Apparatus according to claim 1, wherein:
    said resilient member comprises an upwardly curved arcuate leaf spring extending transversely of said vehicle body for normally urging downwardly said wheel support members coupled to the opposite ends of the resilient member.

5. Apparatus according to claim 1, wherein:
    said load means is disposed between said vehicle body and said resilient member.

6. Vehicle height adjusting apparatus, comprising:
    an elongate resilient member extending transversely of a vehicle body and having opposite ends coupled respectively to two laterally spaced wheel support members, said resilient member having a vertically resilient characteristic and serving as a suspension component;
    retaining means supporting an intermediate portion of said elongate resilient member slidably and swingably on said vehicle body at at least two spaced points on said intermediate portion;
    load means for applying a vertical bending stress to said resilient member to displace the resilient member for thereby varying the height of the vehicle body;
    said load means being capable of applying distributed loads to said elongate resilient member in a range between said two spaced points thereon; and
    said retaining means including a beam disposed below said elongate resilient member and extending substantially in said range, said load means being disposed between said elongate resilient member and said beam.

7. Apparatus according to claim 6, wherein:
said load means comprises means for applying uniform equally distributed loads to said elongate resilient member in said range.

8. Apparatus according to claim 6, wherein:
said load means comprises means for applying irregularly distributed loads to a plurality of spaced areas of said elongate resilient member in said range.

9. Apparatus according to claim 6, including:
upper arms having outer ends pivotally coupled to upper portions of said wheel support members, respectively;
said opposite ends of said resilient member being pivotally coupled respectively to lower portions of said wheel support members; and
said resilient member cooperating with said upper arms in providing double-wishbone suspensions.

10. Apparatus according to claim 6, including:
upper arms having outer ends pivotally coupled to upper portions of said wheel support members, respectively; and
lower arms having outer ends pivotally coupled to lower portions of said wheel support members, respectively;
said opposite ends of said resilient member being pivotally coupled respectively to said lower arms; and
said lower arms cooperating with said upper arms and said wheel support members in providing double-wishbone suspensions.

11. Apparatus according to claim 6, wherein:
said resilient member comprises an upwardly curved arcuate leaf spring extending transversely of said vehicle body for normally urging downwardly said wheel support members coupled to the opposite ends of the resilient member.

12. Apparatus according to claim 6, wherein:
said load means comprises two enclosures which are disposed in two laterally spaced positions within said range and which are adapted to be filled with a fluid by a pump.

13. Apparatus according to claim 6, wherein:
said load means comprises an enclosure adapted to be filled with a fluid by a pump.

14. Apparatus according to claim 13, wherein:
said enclosure comprises an unexpandable enclosure and said fluid comprises a compressible fluid.

15. Apparatus according to claim 13, wherein:
said enclosure comprises an expandable enclosure and said fluid comprises a noncompressible fluid.

* * * * *

UNITED STATES PATENT AND TRADEMARK OFFICE
CERTIFICATE OF CORRECTION

PATENT NO. : 4,858,950

DATED : AUGUST 22, 1989

INVENTOR(S) : Kajiwara et al

It is certified that error appears in the above-identified patent and that said Letters Patent is hereby corrected as shown below:

In the Abstract, line 7, change "bonding" to --bending--.

Column 2, line 2, change "at least" to --at at least--.

Column 4, line 67, change "th" to --the--.

Column 5, line 24, correct the spelling of --concentration--.

Column 6, line 10, after "13" insert --, 14--.

Signed and Sealed this

Twentieth Day of November, 1990

Attest:

HARRY F. MANBECK, JR.

*Attesting Officer*   *Commissioner of Patents and Trademarks*